June 24, 1952  F. A. MAXWELL  2,601,541
RECESSING TOOL
Filed Jan. 13, 1947  2 SHEETS—SHEET 1

INVENTOR.
FRED A. MAXWELL
BY
*Richey & Watts*
ATTORNEYS

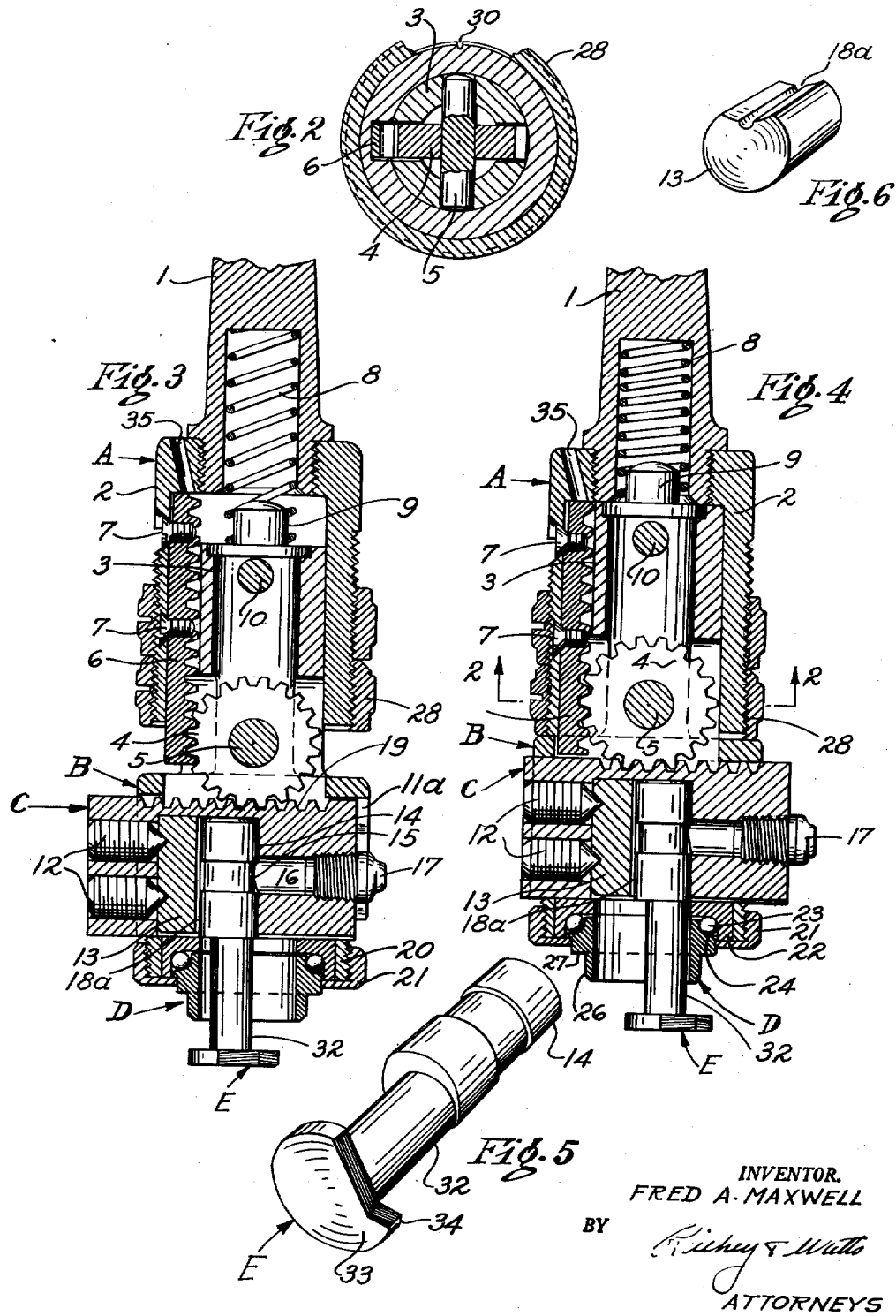

UNITED STATES PATENT OFFICE 2,601,541

RECESSING TOOL

Fred A. Maxwell, Bedford, Ohio

Application January 13, 1947, Serial No. 721,772

1 Claim. (Cl. 77—58)

This invention relates to recessing tools. A primary object of the invention is to provide a new recessing tool which will be accurate and rapid in operation.

Another object of my invention is to provide a recessing tool which will require a minimum of skill to secure accurate operation.

Another object of the invention is to provide a recessing tool of simple construction which will be free from inaccuracies due to wear, friction and lost motion.

Other objects and advantages more or less ancillary to the foregoing and the manner in which all the various objects are realized will appear in the following description which considered in connection with the accompanying drawings sets forth the preferred embodiment of the invention.

In the drawings in which the preferred embodiment of the invention is illustrated:

Fig. 2 is a horizontal section taken on the plane indicated by the line 2—2 of Fig. 4 with parts cut away;

Fig. 3 is a vertical section through the center of the recessing tool showing the parts in one position;

Fig. 4 is a vertical section through the center of the recessing tool showing the parts in a different position;

Fig. 5 is a perspective view of a cutter adapted to be used with this invention; and Fig. 6 is a perspective view of the clamping shoe.

Figure 1:
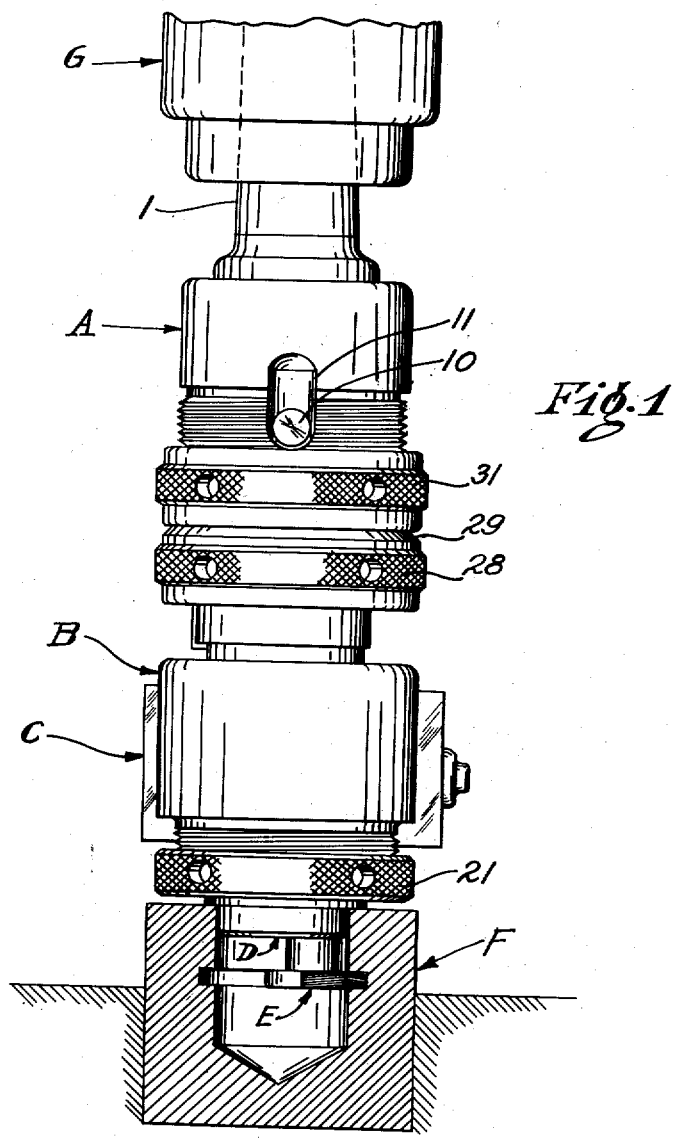
Fig. 1 is a side elevation of the improved recessing tool shown in engagement with the work piece which is being recessed.

Referring first to Fig. 1, the principal parts of the recessing tool embody a sleeve A, body B, tool block C, pilot D, and a cutter E shown in operative engagement with a work piece F. The recessing tool may be mounted in the spindle G of a power machine tool, or non-rotatively supported in a machine of the type in which the work piece is rotated. A conventional tapered shank 1 is provided for insertion in the machine tool. The operation of the recessing tool is in general as follows: Either the tool or the work piece may be rotated, and either may be moved axially into engagement with the other. In the description below, it will be assumed that the tool is moved axially and the work piece rotated. When the tool is moved toward the work, pilot D enters into the hole, centering the tool, and stopping axial movement of the body B. Further movement of spindle G, by mechanism to be described, causes cutter E to be projected laterally against the work piece.

Now referring to Fig. 3, the shank 1 is screwed into the principal part 2 of shell A, slidably mounted within which is a hollow cylindrical plunger 3, the plunger being an integral part of the body B. A gear 4 is disposed in a transverse slot in the plunger 3, a pin 5 serving as a shaft for the gear. The gear engages a rack 6 secured to the sleeve by screws 7. This construction is such that as plunger 3 moves up or down within the sleeve 2, gear 4 is rotated by engagement with the rack 6. A compression spring 8 disposed within the shank and guided by a pilot pintle bears against the top of plunger 3, thereby urging the plunger downward. A pin 10 is pressed or otherwise secured in the plunger 3, the free ends thereof, as will be seen in Fig. 1, being disposed within longitudinal slots 11 in the shell. By cooperation between the wall of the slot 11 and pin 10, torque is transmitted from the shell to the plunger 3.

Referring again to Fig. 3, the tool block C is mounted for transverse movement in a slot 11a machined in the lower portion of body B. Set screws 12 threaded into the block C press a clamping shoe 13 against shank 14 of the cutter E. The shoe 13, as seen more clearly in Fig. 6, is formed with a small groove 18a in the face thereof which engages the tool. A passage 16, provided in the tool block C, may be closed by a plug 17, or, if desired, coupled with a conduit for the delivery of a coolant or cutting compound. The shank 14 of the cutter is relieved to provide an annular chamber 15 adjacent the mouth of the passageway 16. A coolant introduced through the passage 16, passes around the relieved portion 15 of the shank and flows through groove 18a to the cutter.

A rack 19 engaging the gear 4 is machined in the upper surface of the tool block C. The lower portion 20 of the body B is threaded to receive a nut 21. As will be seen in Fig. 4, the nut 21 retains a bearing race 22 and pilot D. Bearing balls 23 running between the race 22 and the race 24 formed in the upper portion of the pilot facilitates the free rotation of the pilot with respect to the body of the tool. The lower portion of the pilot 26 is finished for ready engagement within the hole in the work piece. A shoulder 27 of the pilot engages the surface of the work piece, thereby locating the cutter at the proper distance within the hole which is to be recessed.

Referring again to Fig. 1, a collar 28 adapted for engagement with the upper face of the body B is threaded upon the outer surface of the body A. The upper end of the collar 28 is beveled and formed with graduations 29 thereon adapted to indicate with reference to a groove 30 the translation of the body B and the consequent lateral movement of the cutting tool. A second collar 31 likewise threaded on the body A forms a locking nut for collar 28.

Referring to Fig. 5, the preferred embodiment of the cutting tool E is shown in greater detail. As illustrated the shank 14 is integral with an eccentric stem 32 having a circular cutter 33 of conventional form on the end thereof. The cutting edge 34 of the tool is disposed adjacent the maximum throw of the eccentric stem 32. It will be understood that a tool bit such as customarily used in a fly cutter may be substituted with equal facility for the circular cutter heretofore described.

Referring to Fig. 4, an oil hole 35 may be provided in the head of the sleeve A to accommodate lubrication of the mechanism encased thereby.

The operation of the improved recessing tool is as follows: The tool is moved into the hole which is to be recessed by movement of the spindle G, and the pilot D effects positive alignment of the tool with the work.

As the shoulder 27 is brought into abutting engagement with the work piece the spring 8 will be compressed and permit further movement, the shell thus causing the rack 6 to rotate the gear 4 which, acting upon the rack 19 will effect the translation of the tool block C. Fig. 3 shows the position of the parts before any relative movement between the shell and the body has occurred. In Fig. 4 the parts are shown in their actuated position, i. e., the maximum outward movement of the cutter, or operative engagement thereof with the work. The collar 28 may be adjusted relative to the shouldered end of the body B so as to limit the amount of relative movement between the shell and body and thereby determine the depth of the cut. Of course, this setting need not be changed once established until the cutter is removed for sharpening. As the spindle G is moved away from the work, the compression spring 8 will continue to hold the body and pilot against the work piece until the pin 10 reaches the end of the slot 11. Therefore, the plunger 3 and rack 6 will cause the gear 4 to rotate and move the block C inwardly thus withdrawing the cutter from the recess.

In summary, it will be seen that the only operations necessary in the use of this recessing tool are to advance the tool into impinging engagement against the work piece until it has reached the limit of movement as determined by the preset collar 28, then to retract the tool from the work piece.

An important feature of the construction of this recessing tool is that by traversing the cutter by means of two racks in engagement with a single gear, backlash and chatter are substantially eliminated, and the depth of cut is very accurately controlled.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What I claim is:

In a recessing tool, in combination, a shell comprising a body having a longitudinal opening from one end thereof and a shank projecting from the opposite end of the body, the shell shank defining a longitudinal axis of rotation of the body, a plunger having an upper end and a lower end and including a portion slidable in the opening and constrained against rotation with respect to the shell body, a second portion adjacent the lower end, and an opening diametrically through the second portion, spring means disposed between the upper end of the plunger and the upper end of the opening in the shell, pilot means comprising a generally annular member rotationally mounted at the lower end of said plunger, a tool block comprising a body slidably mounted in the opening in the second portion for horizontal motion with respect thereto, the tool block being adapted to carry an axially directed tool shank and an opening in the second portion of the shank between the pilot and the diametric opening for accommodating the shank, a rack mounted along the upper side of the tool block, a vertically disposed rack along the inner side of the opening in the shell, an opening in the plunger disposed in the plane of the said racks, a gear disposed in said last named opening engaging the two racks and supported by said plunger whereby displacement of the plunger relative to the shell body by engagement of the pilot with a workpiece causes a parallel translation of the tool shank with respect to the axis of rotation of the tool holder.

FRED A. MAXWELL.

REFERENCES CITED

The following references are of record in the file of this patent:

UNITED STATES PATENTS

| Number | Name | Date |
|---|---|---|
| 963,596 | Lescure | July 5, 1910 |
| 1,361,686 | Conwell | Dec. 7, 1920 |
| 1,962,951 | Conwell | June 12, 1934 |
| 2,166,923 | Woodrock | July 18, 1939 |
| 2,365,549 | Haynes | Dec. 19, 1944 |
| 2,431,815 | Linn | Dec. 2, 1947 |

FOREIGN PATENTS

| Number | Country | Date |
|---|---|---|
| 198,194 | Germany | May 7, 1908 |
| 222,341 | Germany | May 26, 1910 |
| 609,356 | Germany | Feb. 13, 1935 |